United States Patent
Murray

(10) Patent No.: US 7,942,475 B2
(45) Date of Patent: May 17, 2011

(54) COMPOSITE REINFORCEMENT FOR A ROOF ASSEMBLY

(75) Inventor: Thomas Murray, Columbiaville, MI (US)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/332,104

(22) Filed: Dec. 10, 2008

(65) Prior Publication Data

US 2010/0140984 A1 Jun. 10, 2010

(51) Int. Cl.
*B60J 7/00* (2006.01)
(52) U.S. Cl. .................. 296/216.07; 296/210
(58) Field of Classification Search ............ 296/210, 296/216.06–216.08, 215
See application file for complete search history.

(56) References Cited

U.S. PATENT DOCUMENTS

| | | | |
|---|---|---|---|
| 6,409,258 B1 * | 6/2002 | Grimm et al. ........... | 296/216.08 |
| 6,824,860 B2 * | 11/2004 | Edwards et al. ........... | 428/218 |
| 7,017,981 B2 * | 3/2006 | Strohmavr et al. ........ | 296/210 |
| 7,625,040 B2 * | 12/2009 | Pollak et al. ........... | 296/216.07 |
| 2003/0118806 A1 * | 6/2003 | Schonebeck ........... | 428/304.4 |

FOREIGN PATENT DOCUMENTS

DE 3835560 * 4/1990

OTHER PUBLICATIONS

Ignacio Osio, Ph.D., "Baypreg Attachment Testing, Update Report With Embedded Inserts", Bayer Material Science, Apr. 24, 2007, pp. 1-10.

* cited by examiner

*Primary Examiner* — Dennis H Pedder
(74) *Attorney, Agent, or Firm* — Fitch, Even, Tabin & Flannery; John M. Naber

(57) ABSTRACT

A composite reinforcement for a vehicle roof opening that provides several advantages over the prior art metal ring design. The reinforcement is a composite bonded to the roof, can be polyurethane, and may include fiberglass, such as long fiber injection (LFI) or glass fiber mat. A honeycomb core can also be disposed within the polyurethane made from cardboard or aluminum. Steel inserts can also be formed within the composite to provide attachment points for a variety of functions, such as sunroof module, structural brackets, and locating assemblies. The steel inserts can have external threads to allow composite material to physically capture the insert during formation of the reinforcement. This roof assembly can be mounted to the vehicle in an optimized manner for ease of assembly, color matching, and to provide structure to support a mounted sunroof assembly.

11 Claims, 12 Drawing Sheets

COMPOSITE REINFORCEMENT FOR A ROOF ASSEMBLY

CLAIM OF PRIORITY

None

FIELD OF THE INVENTION

The present invention generally relates to reinforcement of a vehicle roof after an opening has been formed and, particularly, to a composite reinforcement of a vehicle roof for a sunroof opening.

BACKGROUND OF INVENTION

In the art, vehicle assembly can include modular components such as a roof, front end, rear end, and the like. In the past, a conventional sheet metal roof could be welded to the vehicle. Currently, roof assemblies, including composite modular roofs and roofs with modular components such as a sunroof, are typically glued to the vehicle. This typically requires an expensive process with a specific glue station and assembly robot. In this instance, the vehicle roof assembly often requires making a complete new roof skin covered with plastic film or painting or coating metal to color-match the vehicle if the roof assembly is added outside of the normal vehicle paint and assembly process. This type of assembly requires extra development time and cost to change the vehicle structure to accept a modular roof and to process the roof system through the gluing process.

Also known in the art is the need to reinforce a roof after an opening, such as for a sunroof, has been formed. Current roof reinforcement practice is to weld or hem a stamped steel reinforcement ring around the opening. This reinforcement ring can provide several functions, such as: adding structure back to a vehicle's roof that is compromised by the opening, adding components that tie the reinforcement ring onto the body structure, and providing attachment points and locating features to allow a sunroof module to be attached to a vehicle.

Manufacturing roof reinforcements is both time and labor intensive. For example, a sheet metal blank can be processed through a series of dies, then bonded to a roof using anti-flutter technology or structural adhesive either welded or hemmed around the roof opening. The roof and ring assembly is then shipped to a vehicle assembly plant, where it is welded to the vehicle and painted. Finally, at some point in the vehicle assembly, such as the trim operation, a sunroof module is attached to the reinforcement ring.

While this technology marks a great advance in the art, further advances are possible. For example, there is a desire and need in the art to reduce time and cost to manufacture vehicles, while also increasing flexibility and component integration. The present invention attempts to achieve these reductions using composite materials to replace the sheet metal reinforcement ring.

SUMMARY OF INVENTION

Accordingly, the present invention provides a composite reinforcement of a vehicle roof for a sunroof opening.

The present invention composite reinforcement provides several advantages over the prior art in that it: maintains complete functionality of the current metal reinforcement ring design, does not negatively affect the way in which current sunroof systems currently operate, does not increase the overall mass of the roof assembly, offers a weight advantage over the current technology, reduces the overall assembly and material cost compared to the current method, is as strong as or stronger than current metal reinforcement rings, is easy to assemble, is more simple to manufacture in that it reduces the steps/time involved in creating a roof and ring assembly, incorporates flexible geometry and utilizes flexible tooling to reduce costs, and it utilizes existing composite development equipment, such as polyurethane glass encapsulation equipment, known in the art.

In one embodiment for the present invention, the reinforcement is a composite bonded to the roof. The composite can be polyurethane and may also include fiberglass, such as long fiber injection (LFI), glass fiber mat, or metal inlays or inserts if desired.

Additional embodiments can vary the percent fiberglass by volume, such as between 15 to 70 percent. The percent fiberglass by volume can also vary within the composite. In this embodiment, a relatively higher percentage of fiberglass can be found where more structural integrity is needed for the vehicle, as economy, or as dictated by sound engineering practices. As shown, this can include a higher percent fiberglass by volume within the composite disposed adjacent to the roof front corners and the midsection adjacent to a vehicle 'B' pillar.

Additional features that can be added to the invention include a honeycomb core disposed within the polyurethane. The honeycomb core can be cardboard or aluminum. The thickness of the cardboard can vary in thickness, for example, from 6 to 12 mm.

Additional features that can be added to the invention include captured steel inserts to provide attachment points for a variety of functions, such as sunroof module, structural brackets, and locating assemblies. The steel inserts can have features such as external threads to allow composite material to physically capture the insert during formation of the reinforcement.

The composite reinforcement can be formed by supplying a sheet metal roof having an opening, placing a mold of a desired reinforcement configuration at a predetermined place on the roof, and injecting a composite into the mold and to the roof through a reaction injection or other injection molding process.

Other features of the present invention will become more apparent to persons having ordinary skill in the art to which the present invention pertains from the following description and claims.

BRIEF DESCRIPTION OF THE FIGURES

The foregoing features, as well as other features, will become apparent with reference to the description and figure below, in which like numerals represent elements and in which.

DETAILED DESCRIPTION OF THE INVENTION

The present invention generally relates to reinforcement of a vehicle roof after an opening has been formed and, particularly, to a composite reinforcement of a vehicle roof for a sunroof opening.

The present invention composite reinforcement provides several advantages over the prior art in that it: maintains complete functionality of the current metal reinforcement ring design, does not negatively affect the way in which current sunroof systems currently operate, does not increase the overall mass of the roof assembly, offers a weight advantage over the current technology, reduces the overall assembly and material cost compared to the current method, is as strong as or stronger than current metal reinforcement rings, is easy to assemble, is more simple to manufacture in that it reduces the steps and/or time involved in creating a roof and ring assembly (e.g., welding), incorporates flexible geometry and utilizes flexible tooling to reduce costs, and it can potentially utilize existing polyurethane encapsulation capital equipment known in the art.

Figure 3:
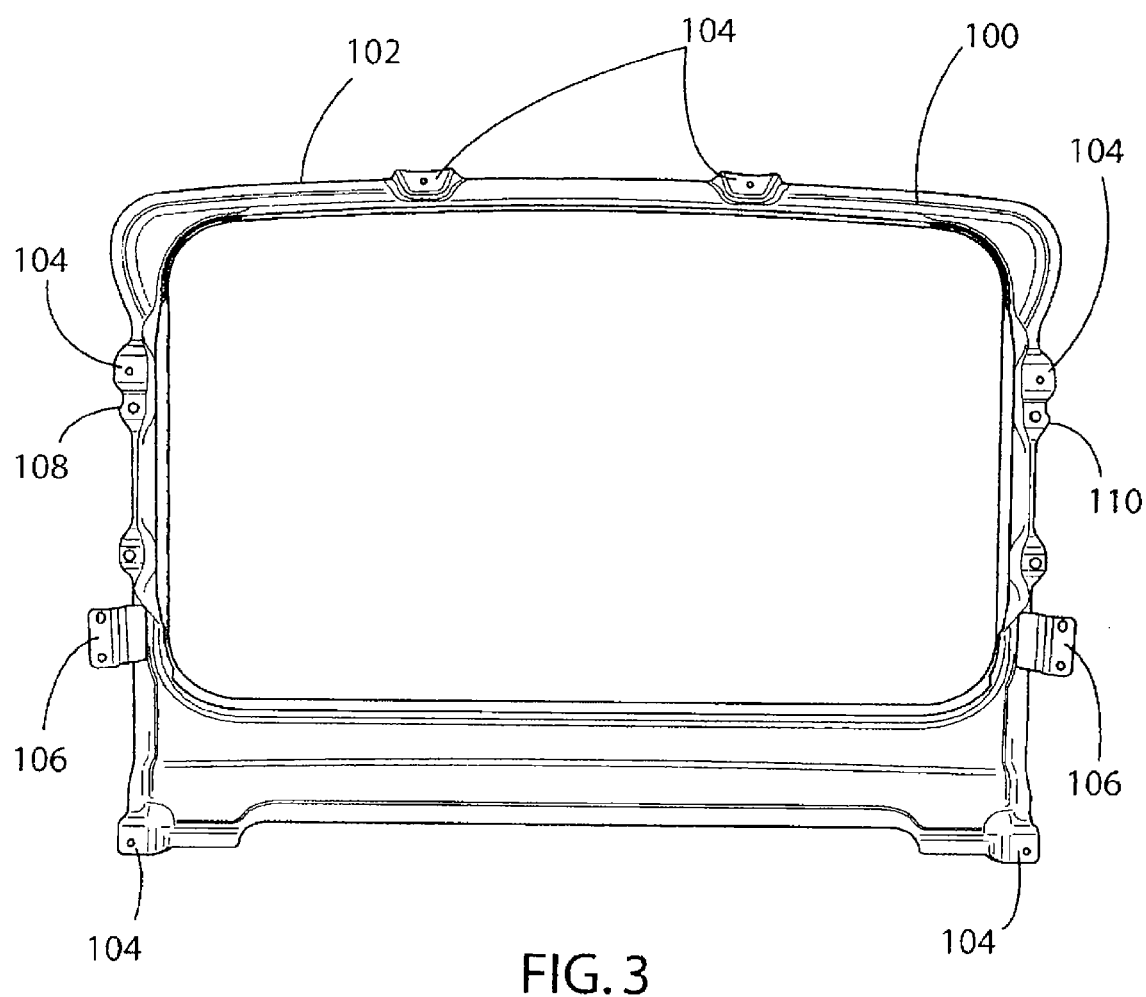
FIG. 3 illustrates functional features of typical prior art sheet metal roof reinforcement ring for an opening of a vehicle roof.

Turning now to the figures, FIG. 3 shows a prior art steel reinforcement ring 100 attached to a conventional sheet metal 102 roof for a vehicle. Many configurations of features of a reinforcement ring 100 are possible. As shown, reinforcement ring 100 can have several attachment points 104 to attach a sunroof module (not shown). Also shown are two structural side brackets 106 and two locating assemblies 108 (passenger side) and 110 (driver side). During assembly, a sunroof module can be attached to reinforcement ring 100 using a bolt or other attachment means known in the art at each attachment point 104 that screws into an included clinch nut, weld nut, flanged hole for a self tapping screw, and the like. Side brackets 106 are included so that when roof 102 is attached to a vehicle during assembly, reinforcement ring 100 can tie into the rest of the vehicle's structure through, for example, side rails known in the art (not shown). Side brackets 106 can be attached to reinforcement ring 100 using two spot welds.

The two locating assemblies can have a 4-way locating hole on the passenger side 108 and a 2-way locating slot on the driver side 110. These locating features can align the sunroof module to the roof opening during installation. There can be corresponding opposing pins and slots respectively in the sunroof module to align these locating features and, thus, the module.

The structural performance and features shown in the prior art (FIG. 3) are all required for a successful new design using composite materials. In a simple form, polyurethane can be used to encapsulate a glass panel (sunroof), creating an engagement feature for the seal and a bonding surface for the frame. Alternatively, this process can be utilized to encapsulate the frame and glass together. There are other more adventurous uses of polyurethane in large panorama modular roofs and polyurethane applications in vehicles to provide structure in 'A' pillars, for example.

Figure 1:
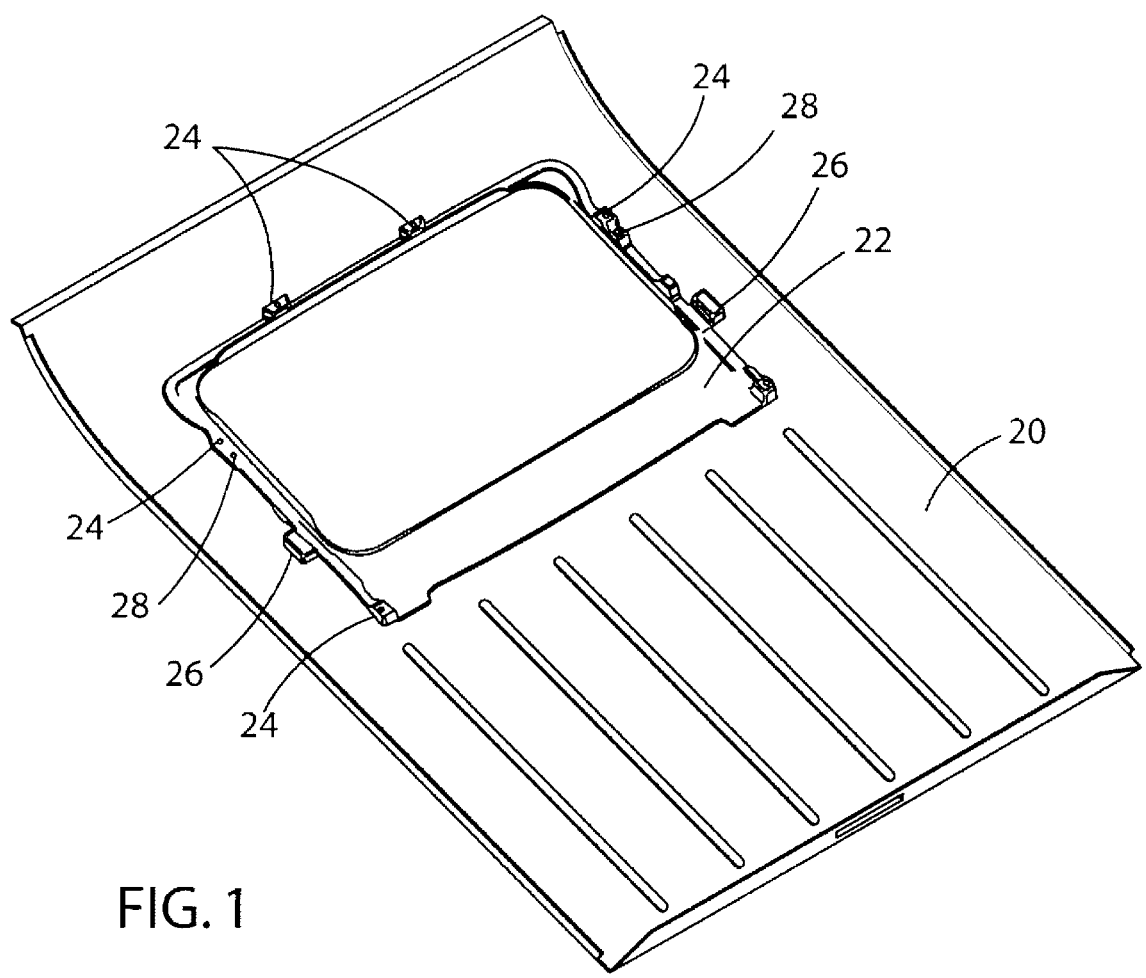
FIG. 1 illustrates one embodiment of a composite reinforcement attached to roof according to the present invention.

For the present invention, the design was created by taking a mold of the downward surface of the traditional reinforcement ring, such as shown in FIG. 3, and filling in the volume between it and the inner surface of the roof. In this way, all of the necessary features were maintained, while efficiently creating a starting point for further investigation. The resulting design is shown in FIG. 1, which shows a composite reinforcement 22 attached to a sheet metal roof 20. The composition of the materials used for composite reinforcement 20 can be varied based on application, desired features, and sound engineering practices. For the present invention, several studies were conducted to determine a composition that could maintain the design features of the prior art reinforcement ring. An initial analysis began with a long glass fiber injected (LFI) polyurethane. Glass fiber mat can also be a potential composition. Where LFI is used, a preferred percentage by volume can be between 15 and 70 percent LFI. Three different levels of glass fiber were selected to be used as needed to meet the strength criteria. The material specifications for this material are shown in Table 1.

TABLE 1

Polyurethane Glass Fiber Material Properties

| Fiberglass | Molded Density (lbs./ft$^3$) | Tensile Modulus (psi) | Tensile Strength (psi) | Poisons Ratio |
|---|---|---|---|---|
| 30% | 60 | 625,000 | 8,600 | 0.30 |
| 37% | 71 | 833,000 | 16,500 | 0.30 |
| 45% | 75 | 1,490,000 | 24,100 | 0.30 |

Figure 2:
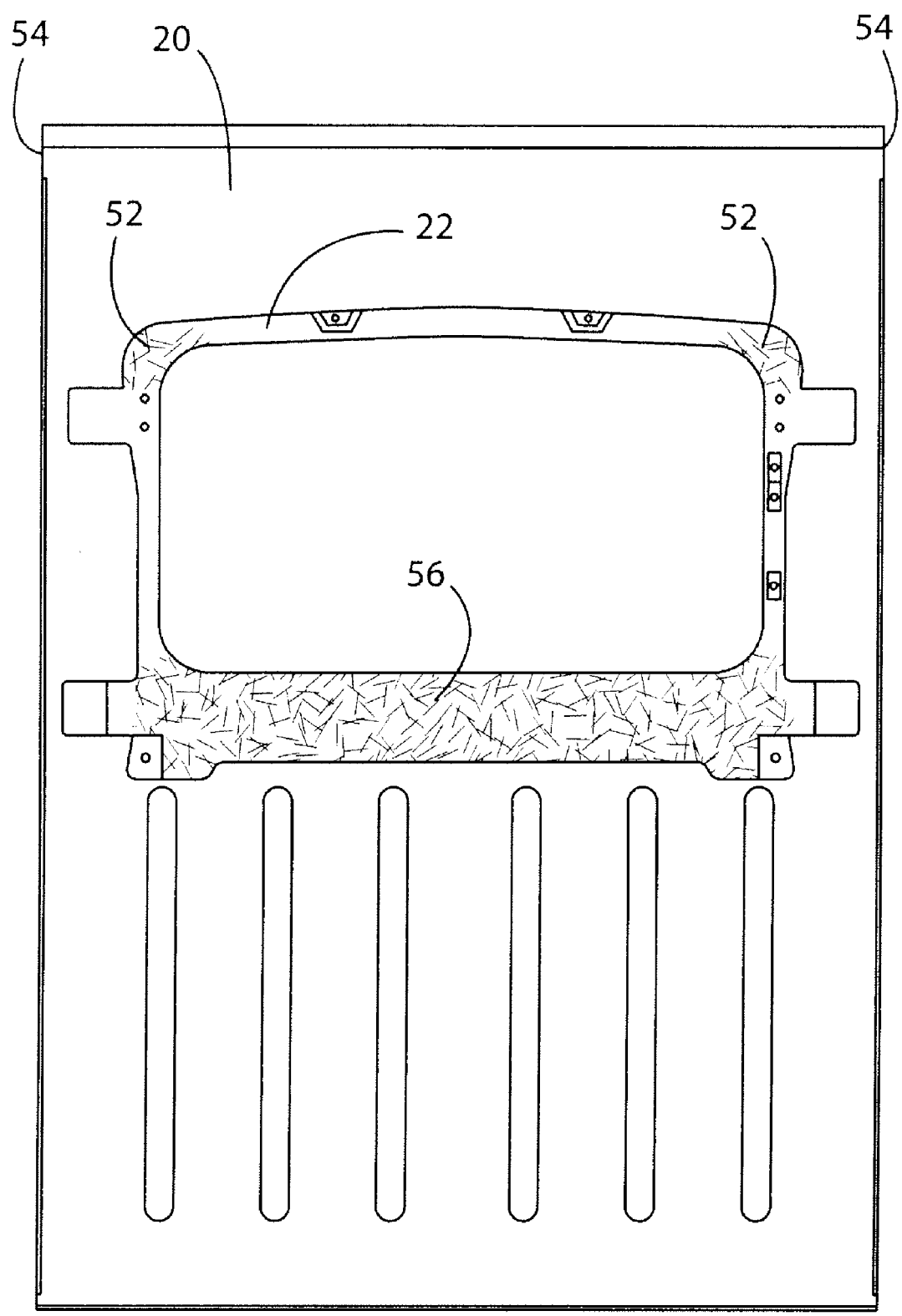
FIG. 2 illustrates a polyurethane composite reinforcement prototype according to one embodiment of the present invention.

Distribution of LFI within the composite can also vary. Again this is dictated by sound engineering practices and economics. It can be desirable to add a higher volume of LFI where greater structural integrity is needed relative to the entire composite. For example, as shown in FIG. 2, composite 22 has front corners 52 nearest to corners 54 of roof 20. Also, a composite midsection 56 can be adjacent to a vehicle 'B' pillar (not shown). The 'B' pillar, known in the art, can be used as an attachment point for vehicle doors and to add side impact strength to the vehicle overall. In the prior art, a metal roof 'bow' has been used as a bridge across the vehicle roof and terminating adjacent to the 'B' pillars' to add structural integrity to the vehicle, such as for side impact. In one embodiment of the present invention, the percent fiberglass by volume can be higher within the composite disposed adjacent to the roof front corners and the midsection 56 adjacent to the vehicle 'B' pillar. Areas of higher LFI percentage by volume are indicated by the shaded areas. Thus, the higher LFI in midsection 54 can provide an effective replacement for the roof 'bow'.

In addition to LFI, a cardboard or aluminum honeycomb core surrounded by a composite polyurethane can also be used. Since this method has two different materials, it is difficult to supply specifications that could apply to every application. If this type of application is desired, a honeycomb core would be modeled to perform the analysis. The basic physical properties of the composite honeycomb polyurethane are shown in Table 2.

TABLE 2

Polyurethane/Paper Honeycomb Composite Material Properties

| | Thickness (mm) | | | |
|---|---|---|---|---|
| | 6 | 8 | 10 | 12 |
| Glass Fiber Mat (g/m$^2$) | 300 | 300 | 450 | 450 |
| Density (kg/m$^3$) | 363 | 304 | 360 | 248 |
| Weight/Unit Area (g/m$^2$) | 2180 | 2430 | 3600 | 2975 |
| Flexural Strength (MPa) | 28 | 22 | 30 | 26 |
| Flexural Modulus (MPa) | 3250 | 2540 | 3540 | 2860 |

As shown, the material properties for the polyurethane and paper honeycomb composite are dependent on the paper core thickness. In addition to this, the properties also depend on the geometry of the part. Therefore, a finite element analysis (FEA) cannot simply be applied to this without accounting for the geometry of the honeycomb core.

Additionally, an acceptable composite reinforcement as an alternative to a traditional reinforcement should not add excess weight to a roof. It should be similar to or lighter than a steel reinforcement's weight of, for example, 2.05 kg, as shown in FIG. 3. A volume and the material density analysis were needed to establish an estimate weight of the composite. The volume of the composite reinforcement (such as shown in FIG. 2) was calculated by computer-assisted design software to be 1,423.73 cm$^3$. Using this volume, Table 6 shows the mass of the composite with the proposed materials.

TABLE 6

Composite Reinforcement Mass versus Fiberglass Content

| Material Type | Fiberglass Content | Density (g/cm$^3$) | Mass (kg) |
|---|---|---|---|
| Long Glass Fiber Polyurethane | 30% | 0.96 | 1.37 |
| Long Glass Fiber Polyurethane | 37% | 1.14 | 1.62 |
| Long Glass Fiber Polyurethane | 45% | 1.20 | 1.71 |
| Polyurethane with Paper Honeycomb | Glass mat x2 | 0.36 | 0.513 |

It is important that, when a composite material is overmolded onto a roof, it has sufficient bonding strength to support the mass of the sunroof module under all road conditions comparable to the metal reinforcement ring of the prior art. To test this bonding strength, pull-out tests of samples of the composite reinforcement were conducted by using different formulations of composites, such as those sold under the trade name BAYPREG F Composite (Bayer Material Science, Germany).

Figure 10:
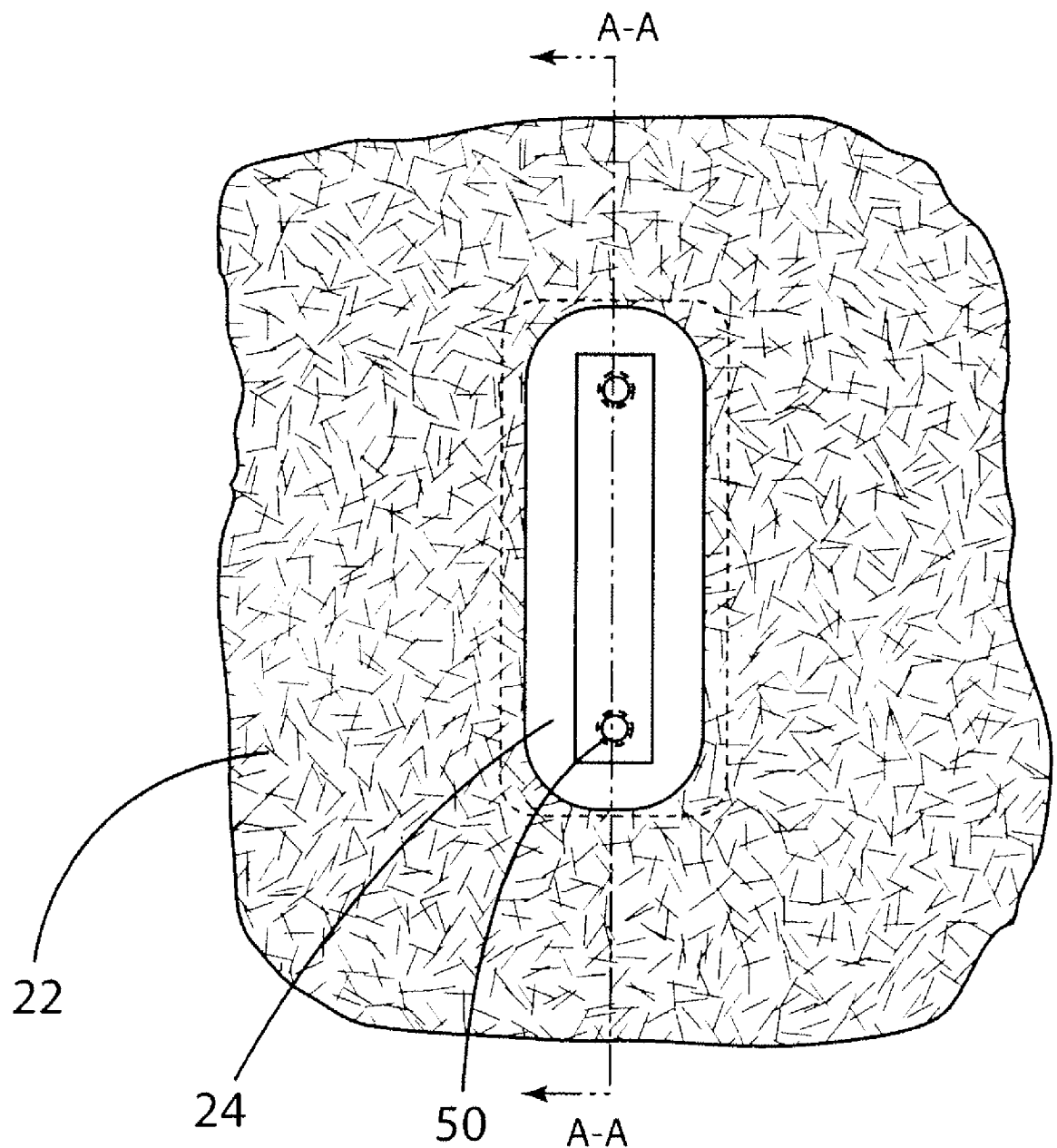
FIG. 10 illustrates a top view of a steel insert attachment point 24 formed with the composite reinforcement of one embodiment of the present invention.
Figure 11:
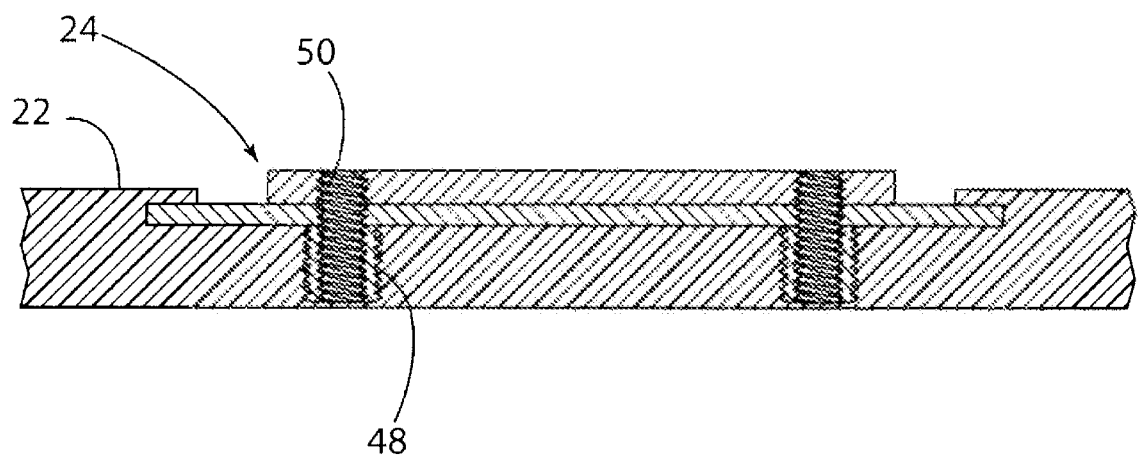
FIG. 11 illustrates a cutaway side view of a steel insert taken at line A-A of FIG. 10 of one embodiment of the present invention showing an external thread to be encapsulated by a composite reinforcement.
Figure 12:
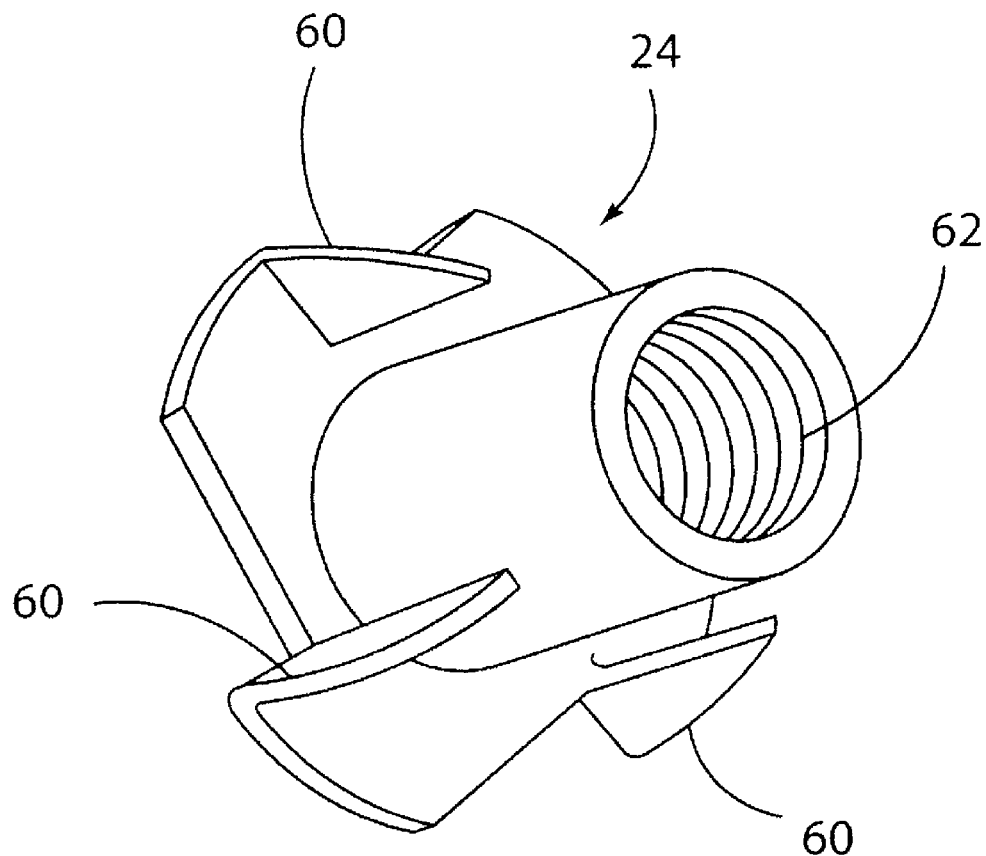
FIG. 12 illustrates a perspective view of an additional embodiment of a steel insert of the present invention.
Figure 13:
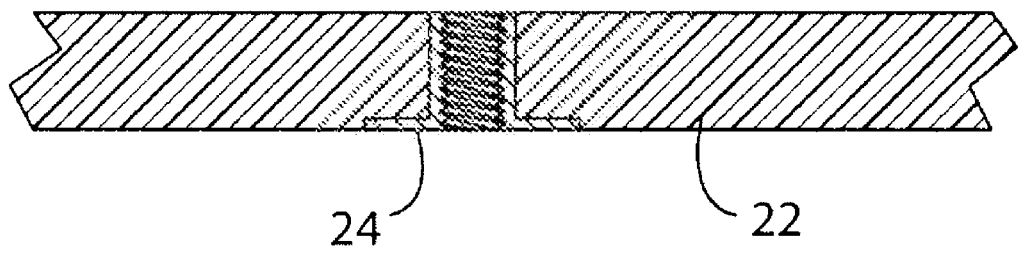
FIG. 13 illustrates a cut-away side view of an additional embodiment of a steel insert of the present invention of FIG. 12.

Steel insert materials (inserted into the composite during formation) were also evaluated. As shown in FIG. 1, the inserts can be comparable to those found for the prior art steel reinforcement. As shown, attachment points 24 can be added to attach a sunroof module (not shown). Also shown are two structural side brackets 26 and two locating assemblies 28. FIG. 10 shows detail of a steel insert that can be specifically used as an attachment point for other hardware. For demonstrative purposes only, the steel insert 24 of FIG. 10 can be used to mount a vehicle "grab" handle. FIG. 11 shows a bottom view of the steel insert 24 of FIG. 10. The inserts can have various features, such as external threads to allow the composite material to physically capture the insert during formation, such as external threads 48 shown in FIG. 11. Further, internal threads 50 can be included to assist in receiving added vehicle hardware. FIG. 12 illustrates a perspective view of an additional embodiment of a steel insert of the present invention. FIG. 13 shows steel insert 24 of FIG. 12 in a side view encapsulated by composite 22. As shown in FIG. 12, insert 24 has fins 60 for encapsulation by the composite. Also shown are internal threads that are exposed to allow threaded attachment of hardware to composite 22.

The strongest formulation of the composite for blasted steel with no coatings yielded a pull-out force of 276.8 lbf. This was over a surface area of ~2300 mm$^2$, yielding a bonding strength limit of 0.1203 lbf/mm$^2$. Because the current composite design offers little physical engagement of the composite to the steel roof, this test overshoots the bonding strength expected. Test results indicate there is a very strong bond between the polyurethane composite and the steel insert and, given the much larger surface area that the reinforcement will cover, it is clearly able to support the weight of the sunroof module.

Manufacturing

During manufacture of a component vehicle roof utilizing the objects of the present invention, a base roof, such as one provided by a vehicle manufacturer, is used to develop the composite reinforcement. The composite structure is applied to this roof, for illustrative purposes only, through a reaction injection molding process. It is noted that other types of composite manufacturing methods are possible within the scope of the present invention. The roof/composite assembly can then be welded to the vehicle on the outer edge of the roof panel like any conventional high volume application. Thus, the vehicle can go through the same base vehicle paint process, including the roof. This simplification of steps provides a larger range of vehicle applications and shapes for the composite structure. The same processes can be used for the base vehicle assembly and painting. This reduces cost of painting and color matching, as well as no additional cost for assembly and capital equipment such as glue and assembly robots. This also provides a substrate for adding composite structure only in areas where you need it on the sheet metal roof, unlike the current modular roof concept whereby the composite area is on the entire plastic paint film surface to reduce visual defects to the class "A" surface.

One potential method to quickly develop a prototype application of a composite reinforcement can be to create a mold using an existing reinforcement ring, coated with a parting agent, as the top of the mold. The sides can then be filled in using modeling clay. Finally, an expanding foam polyurethane, similar to what is used in production, can be injected into the mold, and the mold was disassembled. A typical prototype is shown in FIG. 2.

Testing

A composite reinforcement must perform at or better than specifications for a prior art steel reinforcement ring. To test the effectiveness of the composite reinforcement, a steel reinforcement ring was tested under a variety of configurations to establish a baseline performance for comparison. Factors of strength, manufacturing costs, and assembly costs were also considered.

The strength of the current roof and ring assembly was established using finite element analysis (FEA). As is known in the art, FEA is used in design, development, and analysis of stiffness and strength visualizations and also in minimizing weight, materials, and costs. For the present invention, the FEA involved creating a 3D model of the geometry of the new design with consideration for all of the necessary features and manufacturability. Tests were performed to analyze the strength of various composite configurations to assist in determining the proper composition to meet or beat the strength baseline previously established.

Considerations were made of the need to alter the geometry, if necessary, to meet the strength criteria based on FEA results. Also, once the design was established, it was analyzed for tooling, piece price, and cycle time.

Strength Baseline of Prior Art

Figure 4:
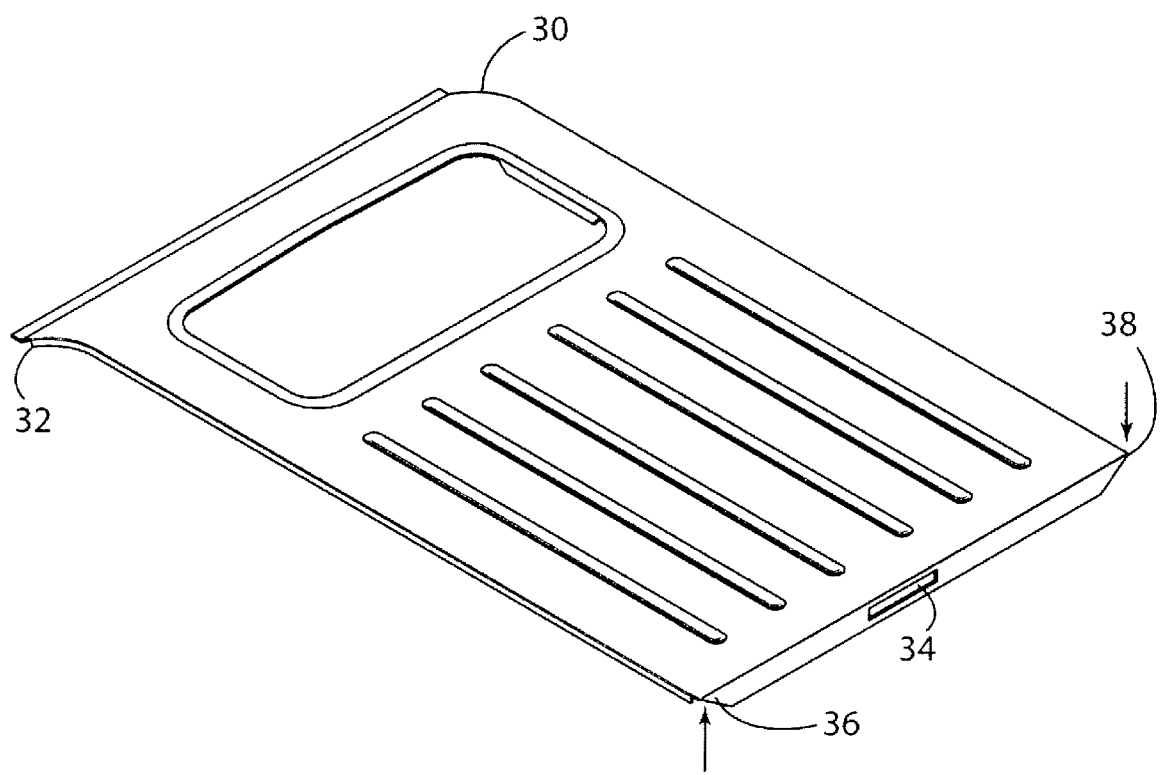
FIG. 4 illustrates a perspective top view roof twist test constraints and loads according to one embodiment of the present invention.
Figure 5:
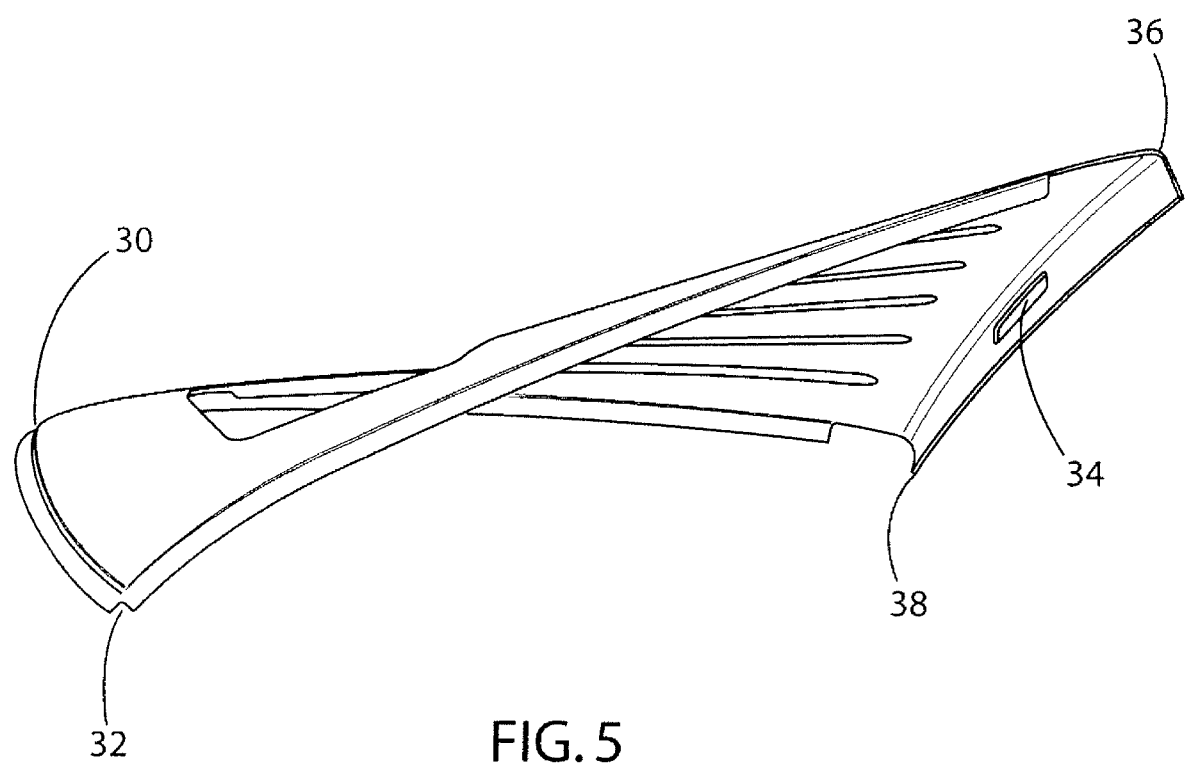
FIG. 5 illustrates a perspective side view of an exaggerated baseline roof twist according to one embodiment of the present invention.

The traditional roof and ring assembly was analyzed using FEA in order to establish a baseline by subjecting it to a roof twist test. FIG. 4 demonstrates how this test was administered. FIG. 4 is a perspective top view of a conventional sheet metal roof. The nodes shown in the figure, which are fixed, demonstrate the constraints applied to the roof during loading. As shown, constraint point 30 is a fixed x-z translation, constraint point 32 is a fixed x-y-z translation, and constraint point 34 is a fixed z translation. The loads are applied to the roof at the rear, as indicated by the arrows at point 36 and 38. As shown, each load is applied in opposite directions, creating a twisting effect. This effect is shown in an exaggerated state in FIG. 5.

Figure 6:
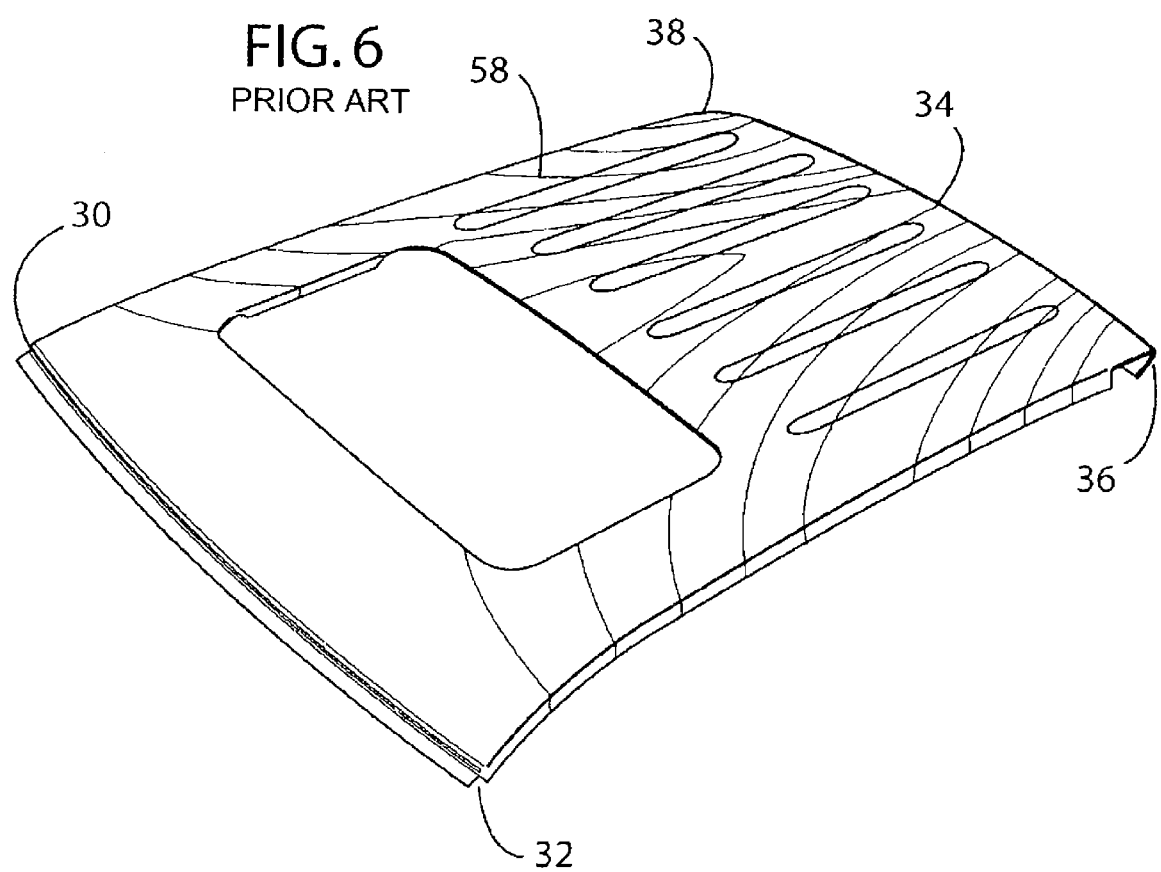
FIG. 6 illustrates a perspective top view of deflection (mm) of a conventional roof with a conventional steel reinforcement ring.

This test allows for a simple comparison between different roofs without having to load a sunroof module. Using this method, different materials can be quickly and easily compared. The results of this test, including deflection, are shown in FIG. 6, which is a roof having a conventional reinforcement ring.

Test results showed a uniform deflection pattern irrespective of the reinforcement used. Therefore, only the peak deflection values need to be compared. Peak deflection always occurs at the load points. In the case of the traditional reinforcement, the maximum deflection of the test load was 33.31 mm. This established the baseline criteria for deflection of the composite reinforcement.

Figure 7:
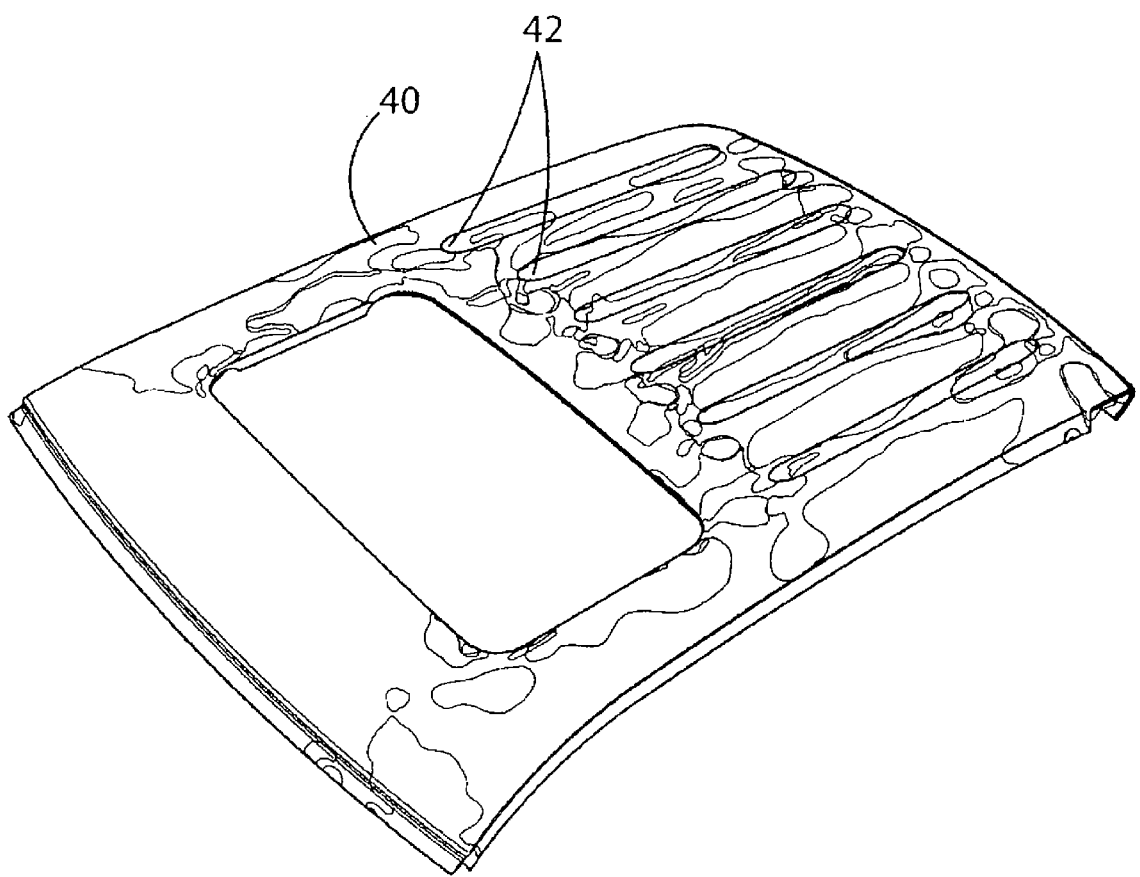
FIG. 7 illustrates a perspective top view of stress (GPa) of a conventional roof with a conventional steel reinforcement ring.

FIG. 7 shows stress levels of a conventional roof that are fairly small in magnitude, reaching a maximum of only 16.67 MPa. The resultant low stress levels is a function of the relatively small loads applied. Nevertheless, the stress areas shown in the figure are of interest, especially those located at the rear passenger side of the opening (for example, at 40) and at the front of several of the raised forms in the roof (for example, at 42).

Figure 8:
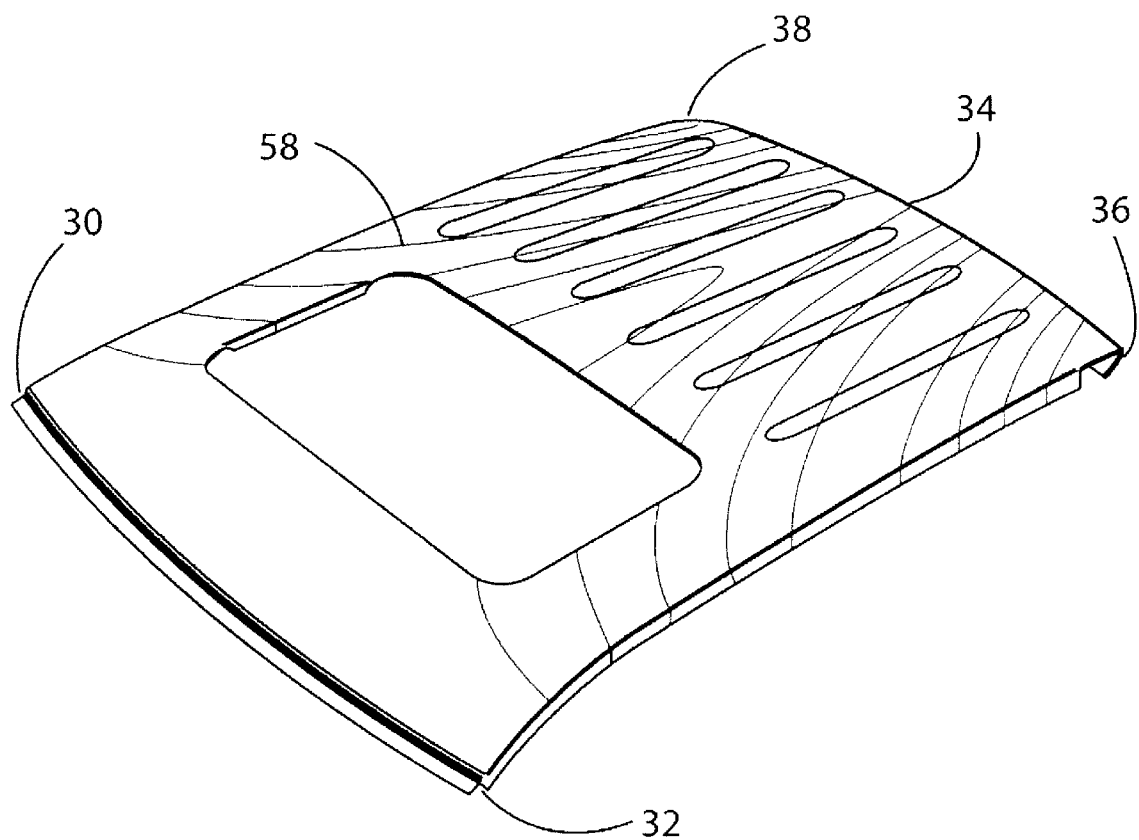
FIG. 8 illustrates a perspective top view of deflection (mm) of a conventional roof with a 30 percent fiberglass composite reinforcement of one embodiment of the present invention.
Figure 9:
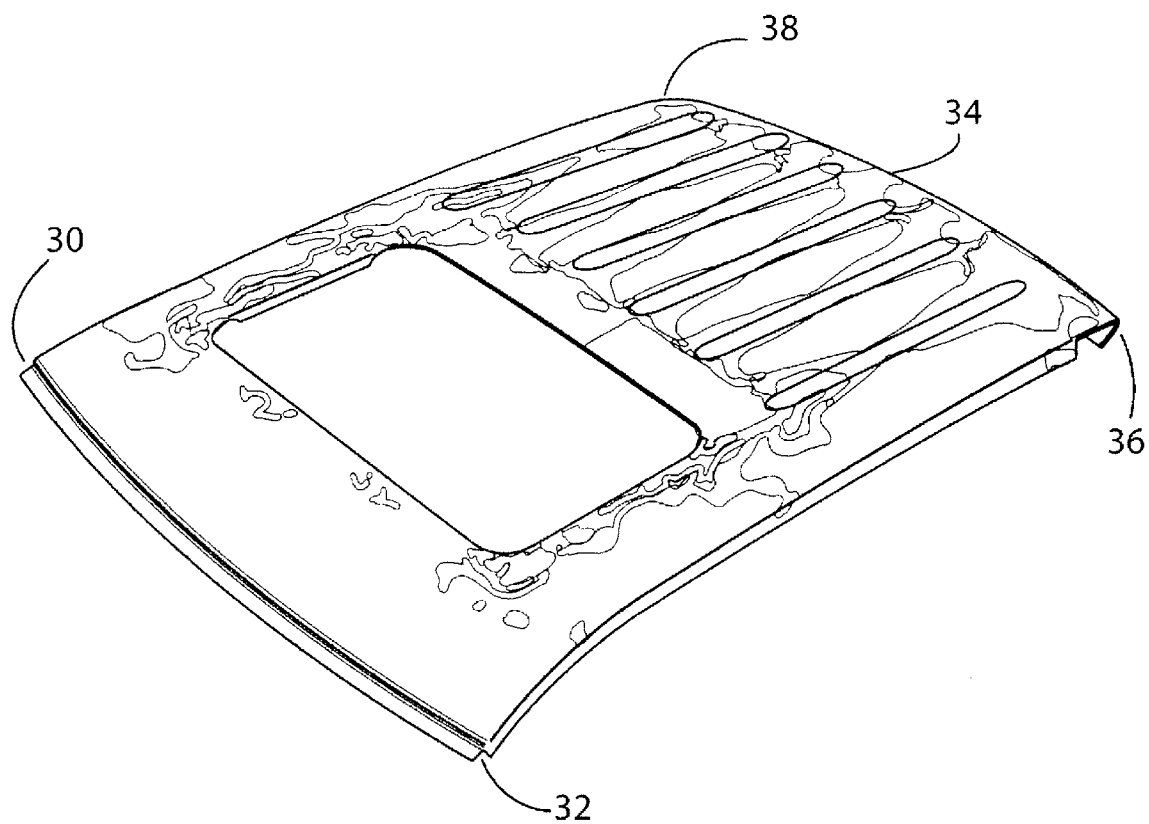
FIG. 9 illustrates a perspective top view of stress (GPa) of a conventional roof with a 30 percent fiberglass composite reinforcement of one embodiment of the present invention.

FIGS. 8 and 9 show comparable deflection and stress test results respectively to a conventional roof that has a composite reinforcement according to the present invention. Initially, the weakest LFI compound is used as the composite material. This was the 30% fiberglass fill LFI. The results of this analysis are shown in FIGS. 8 and 9.

As shown in FIG. 8, the maximum roof deflection (indicated by deflection lines 58, where each deflection line represents a progressively increase magnitude of deflection relative to constraint point 34) of the composite version of the reinforcement was only 16.73 mm. This is a more than 50 percent improvement over the steel ring reinforced roof (which, as shown in FIG. 6, was 33.31 mm). Thus, while the deflection pattern was same, the magnitude of deflection was significantly less in the composite version. Also as shown in FIG. 9, the maximum stress calculated for the composite version was 13.01 MPa. Again, this is a significant improvement over the prior art by 22 percent. Additionally, the weaker areas shown at 40 and 42 of FIG. 7 around the opening and in front of the raised forms where there were stress spikes in the traditional roof, also show a great improvement. The tests show a composite reinforcement distributes the stress more evenly, greatly reducing or, in some cases, completely eliminating areas prone to spikes during stress. Thus, a composite with 30 percent fiberglass performs better than the steel reinforcement in both deflection and stress.

In summary, the present invention composite reinforcement provides several advantages over the prior art. It allows the use of a conventional base roof for structure and substrate for composite structure application. This leads to less mass and optimization of composite structure. It is placed only where it is needed for supporting the sunroof and body interfaces. The base roof can be a higher quality of sheet metal and paint class "A" surface that is same as base vehicle process. It can use the same paint process for color matching as base vehicle versus outside painting. No additional assembly equipment cost or capital equipment cost for welding versus glue operation is necessary. A vehicle manufacturer can weld the roof to the vehicle like conventional base vehicle assembly for higher volume programs versus glue operation for unique niche vehicles. Other advantages include lower cost piece price due to base roof utilization and mass optimization, reduced lead time for development, and reduced vehicle structural body changes required for roof assembly glued to vehicle.

While the invention has been described in conjunction with specific embodiments, it is evident that many alternatives, modifications, and variations will be apparent to those skilled in the art in light of the foregoing description. Accordingly, the present invention attempts to embrace all such alternatives, modifications, and variations that fall within the spirit and scope of the appended claims.

What is claimed is:

1. A reinforcement for an opening of a vehicle roof, comprising:
   a composite ring bonded to the roof, wherein said composite ring comprises long fiber injection (LFI) fiberglass in the range of about 15 to 70 percent volume,
   wherein the percent fiberglass by volume varies within the composite, wherein a relatively higher percentage of fiberglass is found where more structural integrity is needed for the vehicle;
   wherein the roof has an outer rim, and wherein the composite ring is entirely spaced from the outer rim and disposed near the opening so that the composite ring hangs downward from the roof without the composite ring vertically supporting the roof.

2. The reinforcement of claim 1, wherein the composite comprises polyurethane.

3. The reinforcement of claim 1, wherein:
   the roof has front corners and a midsection adjacent to a vehicle 'B' pillar;
   and the percent fiberglass by volume is higher within the composite disposed adjacent to the roof front corners and the midsection adjacent to the vehicle 'B' pillar.

4. The reinforcement of claim 1, wherein the reinforcement has sufficient bonding adhesive to the roof sufficient to support a sunroof module comparable to a steel reinforcement ring.

5. The reinforcement of claim 1, further comprising captured steel inserts to provide attachment points for a sunroof module, structural brackets, and locating assemblies.

6. The reinforcement of claim 5, wherein the steel inserts have features to allow composite material to physically capture the insert during formation of the reinforcement.

7. A roof module for a vehicle which can be mounted from above in an opening in the vehicle body frame and body work and which comprises:
- a sheet metal roof piece having an opening and an inner surface;
- a polyurethane fiberglass composite reinforcement ring bonded on the inner surface of the sheet metal roof piece, wherein said composite ring comprises long fiber injection (LFI) fiberglass in the range of about 15 to 70 percent volume;
- captured steel inserts to provide attachment points for a sunroof module, structural brackets, and locating assemblies;
- wherein the roof has an outer rim, and wherein the composite ring is entirely spaced from the outer rim disposed near the opening so that the composite ring hangs downward from the roof without the composite ring vertically supporting the roof.

8. The reinforcement of claim 1, wherein the composite is glass fiber mat.

9. The reinforcement of claim 6, wherein said features comprise external threads encapsulated within the composite.

10. The reinforcement of claim 9, wherein the external threads further comprise an internal thread, whereby attachment of additional hardware is facilitated.

11. The reinforcement of claim 1, wherein the fiberglass volume is in the range of about 30 percent.

* * * * *